United States Patent
Gadermayr et al.

(10) Patent No.: US 12,354,218 B2
(45) Date of Patent: Jul. 8, 2025

(54) METHOD FOR RECONSTRUCTING A 3D MODEL OF A SCENE

(71) Applicant: SYNTHETIC DIMENSION GMBH, Puch bei Hallein (AT)

(72) Inventors: Michael Gadermayr, Oberalm (AT); Martin Huber, Pfarrwerfen (AT)

(73) Assignee: SYNTHETIC DIMENSION GMBH, Salzburg (AT)

( * ) Notice: Subject to any disclaimer, the term of this patent is extended or adjusted under 35 U.S.C. 154(b) by 186 days.

(21) Appl. No.: 18/020,745

(22) PCT Filed: Aug. 12, 2021

(86) PCT No.: PCT/EP2021/072556
§ 371 (c)(1),
(2) Date: Feb. 10, 2023

(87) PCT Pub. No.: WO2022/034196
PCT Pub. Date: Feb. 17, 2022

(65) Prior Publication Data
US 2024/0037846 A1   Feb. 1, 2024

(30) Foreign Application Priority Data
Aug. 13, 2020 (EP) ..................................... 20190957

(51) Int. Cl.
*G06T 17/00* (2006.01)
*G06T 7/11* (2017.01)
(Continued)

(52) U.S. Cl.
CPC ................ *G06T 17/00* (2013.01); *G06T 7/11* (2017.01); *G06T 7/50* (2017.01); *G06V 20/50* (2022.01);
(Continued)

(58) Field of Classification Search
None
See application file for complete search history.

(56) References Cited

U.S. PATENT DOCUMENTS

| 2019/0164350 A1 | 5/2019 | Yen et al. |
| 2019/0347515 A1* | 11/2019 | Kehl ........................ G06F 18/23 |
| 2019/0362551 A1* | 11/2019 | Sheffield ................ G06T 17/205 |

FOREIGN PATENT DOCUMENTS

CN   110827397 A   2/2020

OTHER PUBLICATIONS

Tran, Jimmy, et al. "3D disaster scene reconstruction using a canine-mounted RGB-D sensor." 2013 International Conference on Computer and Robot Vision. IEEE, 2013 (Year: 2013).*

(Continued)

*Primary Examiner* — Nurun Flora
(74) *Attorney, Agent, or Firm* — Millen, White, Zelano & Branigan P.C.; William F. Nixon

(57) ABSTRACT

A method for creating a 3D model of a scene from a single frame of data points representing image and/or depth data is provided, comprising the steps of: segmenting the data points into a plurality of groups of data points, each group of data points having a high probability of representing a single object; determining, for each group of data points, which method from the group of network completion methods, object assignment methods is suitable for creating a 3D half model from the group of data points; creating a 3D half model from the group of data points according to the determined method, and merging the 3D half models into an overall 3D model.

13 Claims, 3 Drawing Sheets

(51) Int. Cl.
  *G06T 7/50* (2017.01)
  *G06V 20/50* (2022.01)
(52) U.S. Cl.
  CPC ............ *G06T 2200/08* (2013.01); *G06T 2207/10028* (2013.01); *G06T 2207/20084* (2013.01)

(56) References Cited

OTHER PUBLICATIONS

International Search Report for PCT/EP2021/072556 dated Dec. 9, 2021.
Jimmy Tran et al. "3D Disaster Scene Reconstruction Using a Canine-Mounted RGB-D Sensor," 2013, International Conference on Computer and Robot Vision, May 28, 2013.
Li Dongping et al. "Shape Completion from a Single RGBD Image," IEEE Transactions on Visualization and Computer Graphics, IEEE Service Center, Los Alamitos, CA, US, vol. 23, No. 7, Jul. 1, 2017, pp. 1809-1822, XP011650877.
Bo Yang et al. "Dense 3D Object Reconstruction from a Single Depth View" arxiv. org, Cornell Univeristy Library, 201 Olin Library Cornell University Ithaca, NY 14853, Feb. 1, 2018, XP081504804.
Leonardo Gomes et al. "Exploring RGB-D Cameras for 3D Reconstruction of Cultural Heritage," Journal on Computing and Cultural Heritage (JOCCH), ACM, 2 Penn Plaza, Suite 701 New York YI 10121-0701, vol. 11, No. 4, Dec. 5, 2018, pp. 1-24, XP058422048.
Li Feiran et al. "Static 3D Map Reconstruction based on Image Semantic Segmentation," 2018 15th International Conference on Ubiquitous Robots (UR), IEEE, Jun. 26, 2018, pp. 583-585, XP033391054.
Heng Yishu et al. "Keyframe-Based Texture Mapping for RGBD Human Reconstruction," 2018 International Conference on Virtual Reality and Visualization (ICVRV), IEEE, Oct. 22, 2018, pp. 1-7, XP033547474.
English Abstract of CN110827397, Publication Date: Feb. 21, 2020.

* cited by examiner

METHOD FOR RECONSTRUCTING A 3D MODEL OF A SCENE

The invention relates to methods for reconstructing a 3D model of a scene from raw data.

The term "scene" describes a limited three-dimensional environment, for example the interior of a building or part of it, outdoor areas such as gardens or parks, or combinations of these.

3D models of scenes can be used for various purposes. For example, the presence of a corresponding model enables the automatic navigation of autonomous systems in the scene, such as service robots or the like. 3D models may be used to plan and carry out targeted rescue operations, for example in burning or smoky buildings.

A particularly attractive application possibility of 3D models of a scene is the visual simulation of the scene in the context of the application of "virtual reality" (VR) or an "augmented reality" (AR).

In a VR application, a simulated image of the particular scene from a specific observation point is presented to a user via suitable output means, e.g. 3D video glasses, wherein the user can control the observation point via suitable input means, e.g. a data glove. This allows the user, for example, to take a virtual tour of the scene, e.g. a museum, a park, or a property of interest.

In an AR application, a user is presented with an overlay of a real image of the scene, seen from the user's current location, with a simulated image of the scene via suitable output means. Purely video-based 3D video glasses may also be used here as output means, wherein the real image is generated via an integrated camera. Alternatively, data glasses may be used in which the simulated image is superimposed on the user's field of vision via optical elements.

AR applications may be used in the aforementioned rescue operations in smoke-filled buildings to help rescue workers find their way around. During inspection procedures, for example of properties of interest, AR applications may be used to make it possible to experience different configuration variants of the scene, for example the property being under construction or in a state in need of renovation.

3D models of a scene of interest can in principle be created manually or computer-aided from survey data of the scene or from existing data such as building plans, site plans, etc. However, this is time-consuming, and corresponding plans are not always available. Even if plans are available, considerable deviations between the plan and the real scene are not uncommon. Various methods are known to create 3D models of scenes from 2D image or video data with or without depth data, 3D images, 3D point clouds or combinations thereof. 3D point clouds may be created, for example, using 3D laser scanners, LIDAR scanners or TOF cameras. Here, various artificial intelligence methods are used to create a 3D model that is as complete as possible from a limited amount of initial data.

A group of known methods is based in principle on connecting individual points from a point cloud to form a network so that an area of adjacent polynomials, preferably triangles, is created. Such methods are referred to in the following as network completion methods (NCM). These methods are well suited for large-scale scenes having objects with little fragmentation. With objects, however, the problem arises that irregularly shaped objects in particular cannot be fully captured from a single perspective. Although there are methods to close the resulting gaps in the mesh, depending on the perspective this results in significantly varying 3D models. This may cause problems when combining partial models into an overall model. The term "partial models" is used here and in the following to describe 3D models that only represent one part of the scene of interest, since they are determined from a limited number of perspectives.

Other known methods follow the approach of assigning points of a point cloud to one of several known objects that are kept in a database. Such methods are referred to in the following as object assignment methods (OAM). Here, on the one hand, the quality of the created 3D model depends on the size of the database. On the other hand, such methods do not work optimally with wall openings such as doors or windows.

Although the known methods already provide quite good results, there are still problems that stand in the way of conveniently creating 3D models of sufficient quality for the applications mentioned at the beginning.

On the one hand, especially with NCM, a single perspective is usually not sufficient to create a complete 3D model of the scene of interest. This is especially the case if the scene has several separate rooms or areas, and/or significant areas of the scene cannot be captured by the sensor due to shadowing. In order to record measurement data with a sufficient number of perspectives, the particular recording device must be moved between different locations, which is time-consuming.

Suitable recording devices are now available in portable versions, but with them, too there is the problem of precise positioning at suitable locations in order to record the particular measurement data.

In principle, it is possible to continuously operate the particular recording device at a high frame rate while moving it through the scene. This creates a film of the scene, which may be either a simple video film or a video film with additional depth data. Depth data may be explicit, e.g. as depth information stored for each pixel, or implicit, e.g. in the form of a 3D video recorded with a stereo lens. However, this generates an immensely large amount of data. In addition, a partial model must then be created from each individual image, possibly with the associated depth data, and the individual partial models must be combined in a suitable manner to form an overall model. This requires considerable computational effort. This leads to difficulties, especially when using OAM.

In order to reduce the computational effort for the creation of the 3D model from the measurement data, and to optimise, at the same time, the quality of the generated models, a method according to the present invention provides for the following steps: Moving a sensor through the scene of interest, recording measurement data by the sensor, wherein the measurement data is recorded at predetermined or predeterminable time intervals as a sequence of frames, and wherein each frame comprises image and/or depth data, marking a first frame of the sequence of frames, checking at least one further frame from the sequence of frames for criteria that indicate the suitability of the measurement data of the at least one further frame to improve the quality and/or extent of a 3D model of the scene determined from the previously marked frames, and marking the at least one further frame if a corresponding suitability of the measurement data of the particular frame is determined.

Subsequently, 3D partial models are created from several of the marked frames, which are then merged into an overall 3D model to create a complete 3D model of the scene of interest.

A corresponding procedure leads to a significant reduction in the necessary computing effort, especially with OAM, as the number of frames to be processed can be significantly reduced.

The verification of the individual frames for suitability is preferably carried out by an AI system that has previously been trained with suitable training data in order to optimise the selection of frames with regard to the data volume, the computing time and/or the model quality. The model quality may in particular comprise the completeness and/or the consistency of the model. The completeness of the model is understood here as the absence of spatial regions in the 3D model for which no or only few data are available. The consistency of the model is understood to be the absence of spatial regions in the 3D model for which contradictory data are available.

The AI system used for checking may, for example, comprise a multi-layer neural network, which receives as input data the data of the frame to be checked as well as the data of the already marked frames, and indicates as output whether the frame to be checked should be marked or not. The neural network may, for example, be designed as a convolutional neural network (CNN). CNNs are particularly well suited for processing frames of measurement data. Other network architectures such as recurrent neural networks may also be applied.

Instead of the entire frames, the AI system may also receive pre-processed data as input data. For example, the position and/or relative size of prominent objects in the data may be determined by preprocessing and provided to the AI system as input data. Similarly, characteristic data of the position of a 3D point cloud determined from the measurement data may be provided as input data. This may be, for example, the average distance from the sensor and/or the scattering width of the distance values. As further input data, data regarding the measurement quality of the respective frame may be provided to the AI system, for example a value of the image sharpness and/or the number of successfully determined depth points. It is also conceivable to create a rough 3D model from already marked frames with limited computing effort, to estimate the sensor position in the 3D model from the data of the frame to be checked, and to feed this sensor position to the AI system as input data.

Real recorded measurement data from different scenes may be used as training data. However, in order to quickly obtain a sufficiently large amount of training data, this may also be obtained by simulation from existing 3D models. To do this, a virtual sensor is moved through the 3D model and the data recorded by the sensor is simulated in each case. In principle, this corresponds to a virtual tour of the scene using an AR process. The simulated data may be additionally rendered noisy in order to better reproduce real measurement data. By means of such a procedure, a large amount of measurement data can be obtained from existing 3D models in a short time to train the AI system.

In one possible embodiment of the method according to the invention, the checking and marking of the individual frames is carried out simultaneously with the recording of the measurement data. Frames that are not to be marked may be deleted after the checking in order to keep the volume of the data to be stored within limits. It is also possible to permanently store a predefined or predefinable number of leading and/or trailing frames in addition to each marked frame.

Moving the sensor through the scene of interest may be done by an operator carrying the sensor through the scene. For example, the sensor may be designed as a body cam or a head cam, i.e. a camera worn on the body or on the head. In this way, the recording of the data can be intuitively optimised if the operator takes care to capture the scene as completely as possible.

Moving the sensor may also be done by an autonomous or remotely controlled carrier system, for example a service robot or camera drone.

The described method significantly reduces the volume of data to be processed. It may thus be possible to determine an exact 3D model of the scene in real time. For this purpose, the particular marked frames of the measurement data may be transmitted from the sensor to an external processing centre, where a partial model is determined from the available frames. The partial model may be transmitted to the carrier system, which can orient itself in the scene on the basis of the partial model in order to record suitable further data. It is also conceivable to equip the carrier system itself with a computer system that performs the determination of the 3D model; such a processing concept is also referred to as "edge computing", in which case data transmission can be omitted altogether. In any case, both the amount of data to be processed and possibly transmitted and the necessary computing effort and thus the use of resources for the creation of the 3D model are significantly reduced without compromising the scope and/or the quality of the 3D model. The method thus also leads to improved efficiency compared to known methods.

To determine the complete 3D model of the scene, a partial model is created from each of the marked frames. Various AI-based techniques and procedures may be used for this. Methods for this are described e.g. in the following documents: Dai et al: "SG-NN: Sparse Generative Neural Networks for Self-Supervised Scene Completion of RGB-D Scans"; Pumarola et al: "C-Flow: Conditional Generative Flow Models for Images and 3D Point Clouds"; Yang et al: "In Perfect Shape: Certifiably Optimal 3D Shape Reconstruction from 2D Landmarks"; Li et al: "PointAugment: an Auto-Augmentation Framework for Point Cloud Classification"; Wu et al: "PQ-NET: A Generative Part Seq2Seq Network for 3D Shapes".

In the known creation of 3D models from individual frames, results of varying quality are achieved, depending on the structure of the scene and the chosen methodology, wherein each of the known procedures has individual weaknesses, so that an optimal result is difficult to achieve.

This is where another aspect of the invention comes in. According to this aspect, a method for determining a 3D model of a scene from a single frame of data points representing image and/or depth data comprises the steps of: segmenting the data points into a plurality of groups of data points each of which represent a single object with high probability; determining for each group of data points which method from the group of network completion methods, object assignment methods, is suitable for creating a3D model from the group of data points, creating a 3D partial model from the group of data points according to the determined method, and merging the 3D partial models into an overall 3D model.

The point cloud obtained is therefore first segmented to obtain subsets of the point clouds each of which being very likely to belong to a common object. For each of the objects separated in this way, it is decided separately whether it is better to convert it into a 3D model according to an NCM or according to an OAM.

AI-based methods may be used both for the segmentation of the point cloud and for the selection of a suitable method for model generation, wherein a support vector machine (SVM) may be particularly suitable for this type of task. SVMs are mathematical methods for finding separating surfaces between point clouds in a multi-dimensional space, thus enabling the most accurate possible assignment of a point to one of several separate point groups. The dimensions of the space may be real geometric dimensions, e.g. for segmenting the point cloud of a captured frame into several objects.

However, the dimensions of the space may also be abstract dimensions. For example, in order to make it possible to distinguish whether a particular point cloud is better processed with an NCM or with an OAM, a recurrent neural network (RNN) may be used to compute a single n-dimensional point from a point cloud representing an object. This n-dimensional point may then be passed to an SVM, which determines whether the point belongs to a first point group or a second point group. The first point group may represent objects that are better processed with an NCM, while the second point group may represent objects that are better processed with an OAM.

The neural network and the SVM may be trained together. To do this, the neural network is fed a large number of point clouds of each group of objects. The neural network then randomly generates n-dimensional points and passes them to the SVM, which tries to achieve a sharp separation between the particular object groups. The quality of the achievable separation is then given in a feedback loop to the neural network, which in turn adjusts the calculation method of the n-dimensional points to optimise the quality of the separation. The training data used for the described optimisation may be real measurement data or simulated test data.

Other AI-based methods may also be used for both the segmentation of the point cloud and the selection of a suitable method for model generation, wherein a multi-layer neural network is particularly suitable for this type of task. Architectures such as PointNet (Qi et al: "PointNet: Deep Learning on Point Sets for 3D Classification and Segmentation") or PointNet++(Qi et al: "PointNet++: Deep Hierarchical Feature Learning on Point Sets in a Metric Space") use vectors consisting of individual points as input and can generate segmentations or classifications based on these.

To train these architectures, pairs of input data (point cloud) and output data (e.g. object class) are necessary.

If several tasks (e.g. segmentation and classification) are to be learned at the same time, the parameters (network weights) may be shared (parameter sharing), which may increase the efficiency and effectiveness of the training.

This method may also be adapted to decide whether a certain point cloud should better be processed with an NCM or with an OAM. For this, mainly the pairs of the data for training have to be adapted.

While the input data remains unchanged, a scalar binary value is defined as output per input (e.g. 0: NCM, 1: OAM). Thus, the network is optimised to predict this (and thus the preferred method). The data for the training, especially the output data, may be determined by empirical experiments.

Since this project focuses specifically on human perception, this may be done, for example, by means of a group of test persons who subjectively assess the quality of the data. By averaging (mean-opinion-score), it may finally be decided for each input datum whether NCM or OAM represents the advantageous procedure.

Other network architectures may also be applied.

After assigning the individual objects, a separate 3D half model is first created from each of the two groups, i.e. the group of objects suitable for an OAM and the group of objects suitable for an NCM, wherein an NCM or an OAM is applied accordingly. The term half model is used here and in the following to refer to a 3D model that only contains the objects that were reconstructed with an OAM or an NCM. The respective procedures again involve the use of AI methods. These are described in the articles mentioned above and will therefore not be discussed further here. Subsequently, the two 3D half models are merged into a common 3D model or 3D partial model. This is relatively uncomplicated, as both 3D half models were determined from the same perspective and thus do not need to be realigned with each other.

The 3D sub-models determined from the individual marked frames according to the procedure described above are then combined into an overall 3D model, wherein the alignment of the individual 3D partial models is carried out on the basis of distinctive structures in the areas in which the 3D partial models overlap. It must be taken into account here that the 3D models calculated according to known methods are usually constructed from point clouds connected to form a network. This does not pose a problem when reconstructing the scene from a single frame. In order to align two overlapping 3D partial models to each other, these point clouds are not well suited because the positions of the individual points in the individual 3D partial models do not correlate. It is therefore necessary to extract geometric structures from the point clouds, which can then be aligned with each other. Flat surfaces or edges are particularly suitable for this. The extraction of surfaces and/or edges from point clouds is known in itself and is therefore not described in detail here. The 3D partial models are then aligned with each other so that corresponding contours match as closely as possible.

An AI-based method may also be used to combine the 3D partial models. For example, a recurrent or convolutional multilayer neural network may also be used here, to which the 3D partial models are fed as input data. The neural network may output the relative position of the 3D partial models to each other as output data, so that the 3D partial models can be combined by means of one simple operation.

For training the AI system to be used for combining the 3D partial models, real or simulated measurement data and 3D partial models determined from them, whose relative position to each other is known, may be used in a similar way as described above for checking the frames.

According to another aspect of the invention, additional data may be used to calibrate the 3D model of the scene before, during or after the partial models are joined. For example, exterior images of a building, such as aerial or satellite images, may be used to create an exterior outline of the building into which the 3D model to be determined can be fitted. This makes it possible to correct distortions and angular errors in particular, which may arise due to measurement inaccuracies at narrow passages such as doors.

With the methods described, it is possible to determine 3D models of scenes of interest with high quality and, at the same time, with manageable data and computational effort.

BRIEF DESCRIPTION OF THE DRAWINGS

An example of an embodiment is shown below with the aid of some figures in order to explain the described methods in more detail. Shown are:

FIG. 2: the ground plot of FIG. 1 with the trajectory of a sensor drawn in,

FIG. 1 shows a scene, which in this example is a flat. In order to enable a potential buyer of the flat to take a virtual tour of the flat, a 3D model of the flat is to be created. The flat comprises a central connecting corridor 1 as well as rooms 2, 3, 4, 5, which are connected to each other by doorways 6, 7, 8, 9. In room 2 there is an object 10, for example a table. Windows 11, 12, 13, 14 are provided in the walls of rooms 2, 3, 4, 5.

To generate the raw data for creating the 3D model, a sensor, for example a TOF camera or a video camera with integrated LIDAR sensor, is moved through the scene. The sensor may also be a stereo video camera, from whose images depth data can also be determined. For this purpose, a person may carry the portable sensor through the scene, e.g. as a head or body cam, or the sensor is attached to a mobile carrier system that moves through the scene remotely or autonomously.

Figure 1:
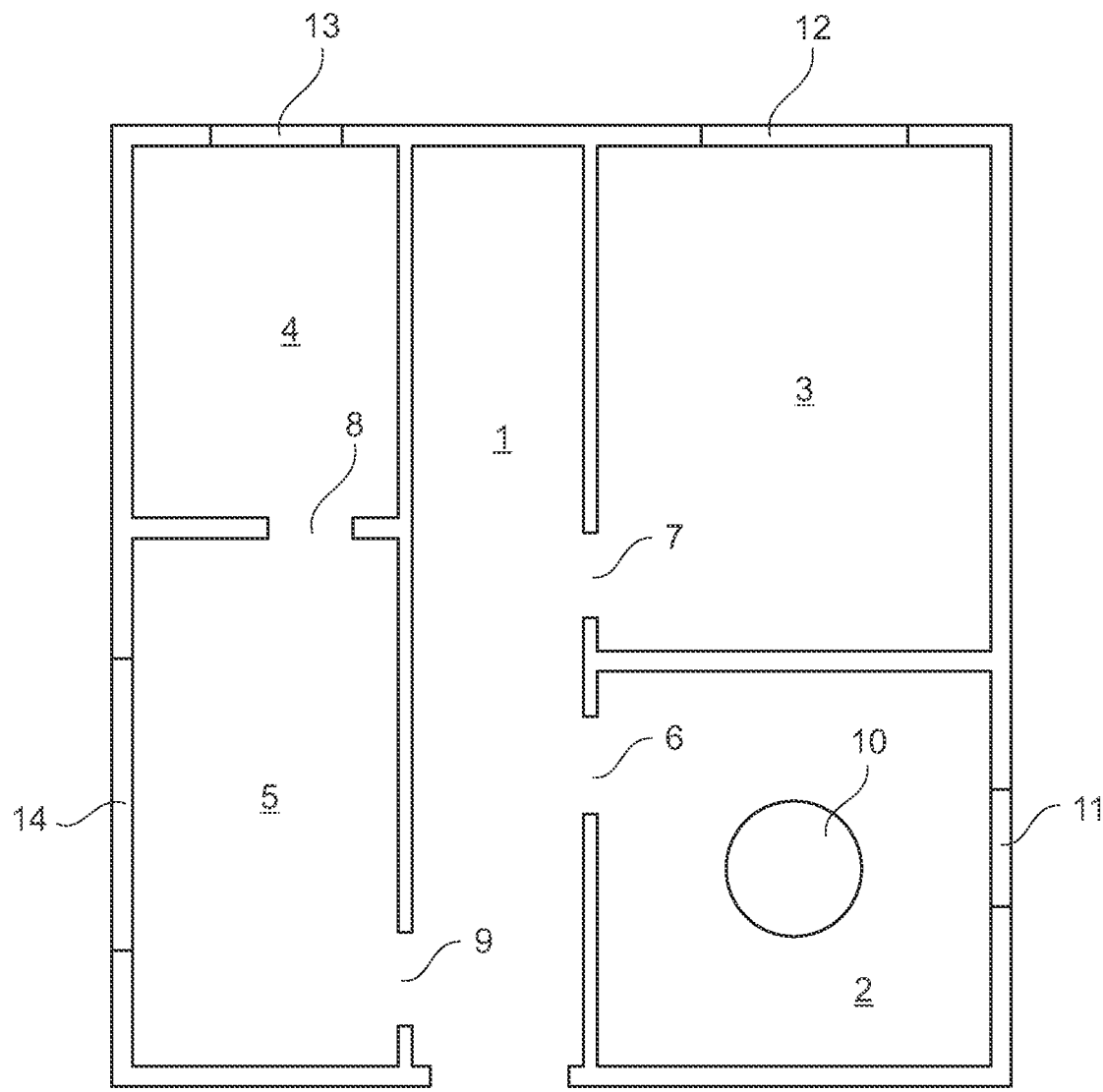
FIG. 1: a ground plot of a scene.
Figure 2:
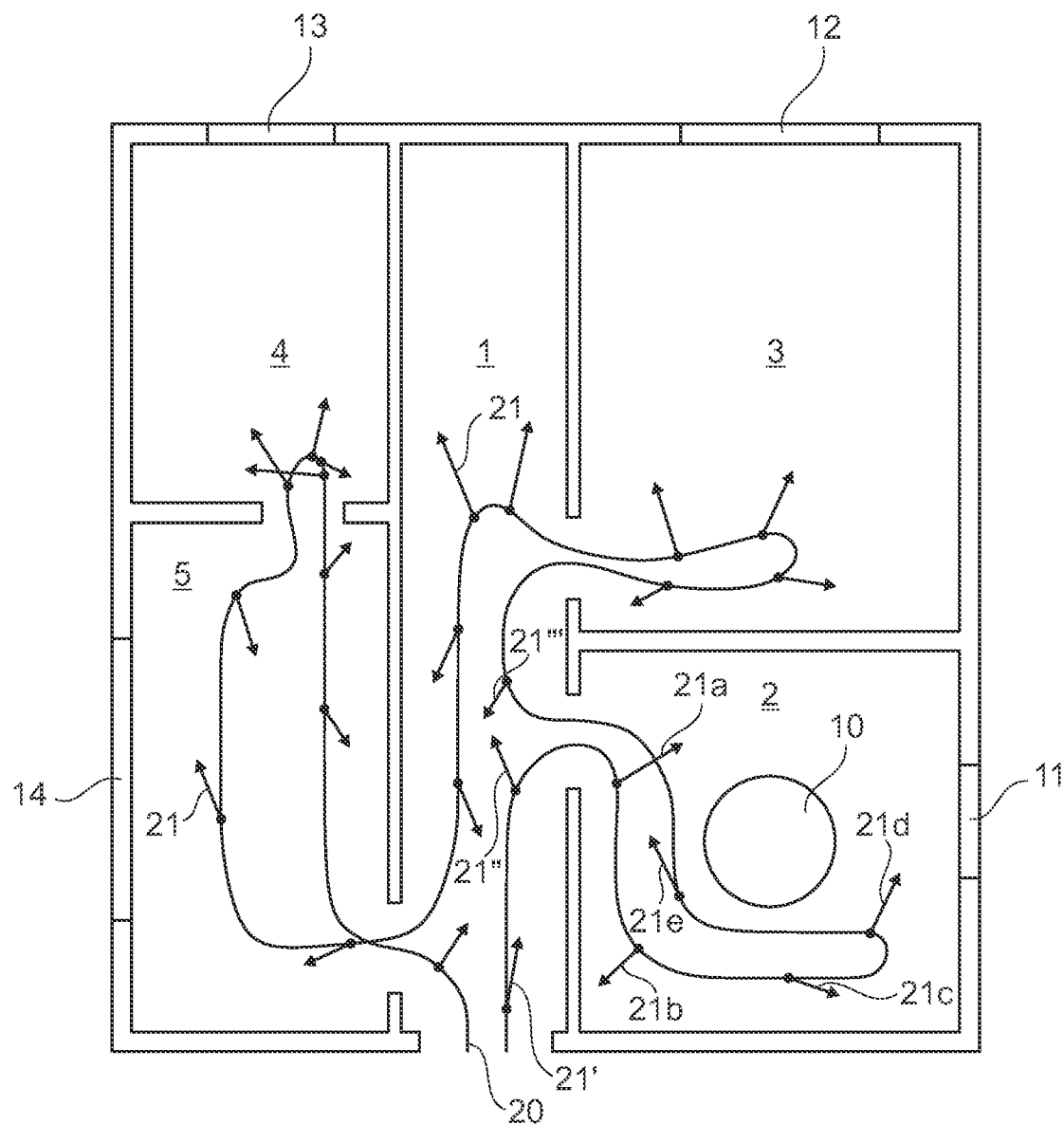

A possible trajectory 20 of the sensor is shown in FIG. 2. It can be seen that the sensor is moved through corridor 1 and all rooms 2, 3, 4, 5. Arrows 21 indicate a respective viewing direction of the sensor.

As the sensor moves through the scene, which may take 20 minutes, for example, the sensor records data in the form of frames. This records, for example, high-resolution video images with integrated depth data at a repetition rate of 50 frames per second, creating a movie. The data may be stored in the sensor and/or streamed in real time to a base station not shown. The resulting amount of data is very large, so that a subsequent evaluation to create the 3D model is very time-consuming. For the creation of high-quality 3D models, high-resolution frames in good image quality are indispensable, which is why common lossy data compression methods cannot be used here, or only to a limited extent.

To reduce the computational effort, the recorded film is filtered by an AI system. For this purpose, a first frame of the film is marked, which is recorded for example at the beginning of trajectory 20 at arrow 21'. Subsequent frames are checked by the AI system, which may comprise, for example, a recurrent or a convolutional neural network, to determine whether the respective frame can meaningfully improve or augment a 3D partial model created from the previously marked frames. If this is the case, the additional frame is also marked, otherwise it is not marked. Depending on the data volume of the frames and the storage volume of the sensor, or the bandwidth of a data transmission between the sensor and a base station, unmarked frames may be discarded or stored anyway. If necessary, a certain number of leading and/or trailing frames may also be stored for each marked frame.

The relevance of a frame depends on both the location of the shot and the direction of view. For example, a frame taken at arrow 21" adds little relevant information compared to the frame taken at arrow 21' and is therefore not marked, while a frame taken at arrow 21'" from almost the same location is very relevant due to the opposite viewing direction and is therefore marked.

During the creation of the 3D model, 3D partial models are now determined from the individual frames, which are then assembled into an overall 3D model.

FIGS. 3a to 3d show frames taken at arrows 21a, 21b, 21c, 21d, 21e. They each show different perspectives of room 2.

Figure 3A:
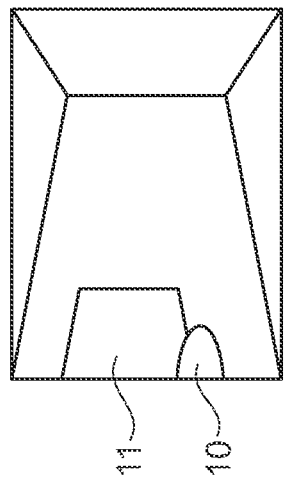
FIG. 3a-e: frames with measurement data.
Figure 3B:
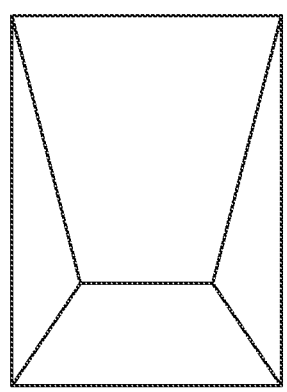
Figure 3C:
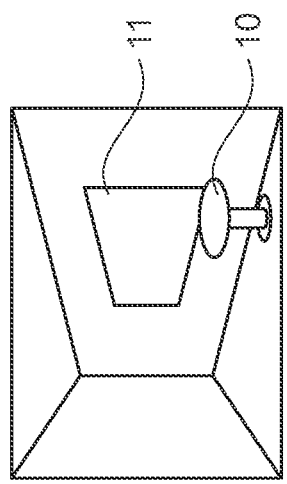
Figure 3D:
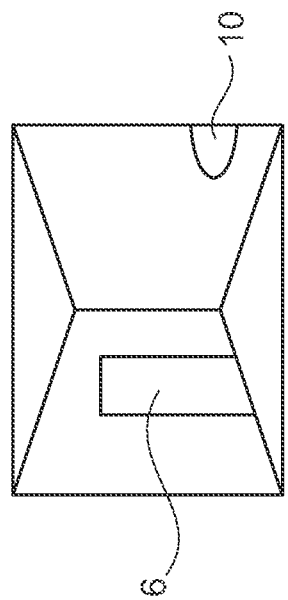
Figure 3E:
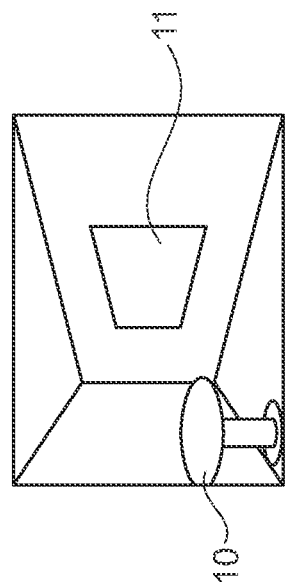

It can be seen that in the first frame (FIG. 3a), window 11 is partially covered by table 10, which makes it difficult to model window 11 accurately in a 3D model. The same applies to the third frame (FIG. 3c). The fourth frame (FIG. 3d), on the other hand, shows window 11 completely, so that a 3D model of room 2 can be created completely from the five frames shown.

When evaluating the frames showing table 10, it is difficult to create a partial 3D model. The walls of the room, door 6 and window 11 can be evaluated well with an NCM, which, however, is not well suited for table 10. An OAM is more suitable for table 10, which in turn is less suitable for walls and windows.

To solve this problem, the data of the individual frames are first segmented by an AI system, i.e. divided into data groups that each belong to one element. AI systems for corresponding segmentation tasks are known to the expert; they are often based on SVMs or use CNNs. In the frame of FIG. 3a, for example, the elements "wall left", "wall right", "window", "table", "ceiling" and "floor" are separated during segmentation.

The data belonging to the particular element are now checked by a wide algorithm for their suitability for a NCM or an OVV. An SVM is also suitable for this purpose, which assigns a point cloud presented as input data to one of the two methods on the basis of extensive training data.

The segmentation and allocation of the individual objects may also be carried out by a CNN or an architecture such as PointNet. Segmentation and allocation may be done separately or combined in an "end to end" process.

Walls, windows 11, floor and ceiling are modelled by a NCM. In such a procedure, a network is created from an existing point cloud by connecting neighbouring points. The resulting networks may be optimised, e.g. by smoothing, equalising the point density or similar.

Corresponding procedures are known, for example, from the article Berger et al: "A Survey of Surface Reconstruction from Point Clouds".

Table 10, on the other hand, is processed in an object mapping procedure. For this purpose, the point cloud is compared by an AI algorithm with objects stored in a database. As soon as a matching object is found, an exact 3D model of this object stored in the database is inserted into the 3D partial model to be created. Corresponding procedures are known, for example, from the article Aubry et al: "Seeing 3D chairs: exemplar part-based 2D-3D alignment using a large dataset of CAD models".

The 3D partial models determined from each individual frame are then combined to form an overall 3D model of the scene. In the example shown, at least four 3D partial models are available for corridor 1 and rooms 3, 4, 5, and at least 5 for room 2.

For the alignment of the 3D partial models to each other, areas are evaluated in which the 3D partial models overlap. Geometrically defined objects in these overlapping areas are matched by an algorithm that minimises an alignment error of all objects.

It must be taken into account that the 3D partial models determined according to a NCM do not necessarily contain such geometric objects. While, for example, edges and large flat surfaces are visible in FIGS. 3a-d, there are not necessarily any representations of these in the 3D partial models, which only contain a close-meshed network generated from a point cloud. The position of the nodes of the networks in the 3D partial models is random.

Therefore, edges and planar surfaces in the 3D partial models must be determined in an intermediate step. For this purpose, known regression methods may be used, for instance. The objects determined in this way are then used to align the 3D partial models.

The merging of the 3D partial models works with high accuracy if there are sufficient overlapping areas. While this is not a problem for single rooms, merging several rooms that are only connected by a narrow doorway can lead to alignment errors. This may cause distortions in the overall 3D model.

To avoid this, an overall outline of the scene may be taken into account when combining the 3D partial models, which may be determined from exterior, aerial and/or satellite photographs, for example. Reasonable assumptions can be made regarding boundary conditions, e.g. constant thickness of interior and/or exterior walls, etc.

The embodiment example described here serves only for a better understanding of the invention without limiting it. The scope of protection is to be determined on the basis of the accompanying patent claims.

The invention claimed is:

1. A method for creating a 3D model of a scene from a single frame of data points representing image and/or depth data, the method comprising the steps of:
    segmenting the data points into a plurality of groups of data points, each of which having a high probability of representing one single object,
    determining, for each group of data points, which method from the group of network completion methods, object assignment methods is suitable for creating a 3D model from the group of data points,
    creating a 3D half model from the group of data points according to the determined method, and
    merging the 3D half models into an overall 3D model, wherein the determination of the suitable method is carried out by means of an artificial intelligence (AI) system, and wherein, in order to determine the suitable method, the group of data points is transformed into a single, n-dimensional data point in a coordinate space in which objects suitable for network completion methods and objects suitable for an object assignment method are mapped as separable point clouds.

2. The method according to claim 1, wherein the transformation is carried out by means of a convolutional or recurrent neural network.

3. The method according to claim 1, wherein the assignment of the n-dimensional data point to the suitable method is carried out by means of a support vector machine.

4. The method according to claim 1, wherein the determination of the suitable method is carried out in an "end to end" method by means of a multilayer neural network.

5. The method according to claim 4, wherein the segmentation and the determination of the suitable method are carried out together in an "end to end" method by means of a multilayer neural network.

6. A method for creating a 3D model of a scene comprising the steps of:
    moving a sensor through the scene,
    recording measurement data by the sensor, the measurement data being recorded at predetermined or predeterminable time intervals as a sequence of frames, and each frame comprising image and/or depth data,
    marking a first frame of the sequence of frames,
    checking at least one further frame from the sequence of frames for criteria indicating the suitability of the measurement data of the at least one further frame for improving the quality and/or the extent of a 3D model of the scene determined from the previously marked frames,
    marking the at least one further frame if a corresponding suitability is determined,
    creating a 3D partial model from a plurality of the marked frames using the method according to claim 1, and
    merging the 3D partial models into an overall 3D model.

7. The method according to claim 6, wherein the checking is performed using the AI system, preferably a convolutional neural network.

8. The method according to claim 7, wherein the measurement data of a frame to be checked is subjected to pre-processing before being checked by the AI system.

9. The method according to claim 8, wherein the pre-processing comprises object recognition.

10. The method according to claim 8, wherein the pre-processing comprises statistical analysis of depth data.

11. The method according to claim 6, wherein the checking of the frames is performed in real time during the recording of the measurement data.

12. The method according to claim 11, characterized in that unmarked frames are discarded.

13. The method according to claim 6, wherein the movement of the sensor is performed by an autonomous or remotely controlled carrier system.

* * * * *